United States Patent [19]

Yamada

[11] Patent Number: 5,282,150
[45] Date of Patent: Jan. 25, 1994

[54] STATISTICAL PROCESSOR

[75] Inventor: Takamitsu Yamada, Toyonaka, Japan

[73] Assignee: Ricoh Company, Ltd., Tokyo, Japan

[21] Appl. No.: 650,951

[22] Filed: Feb. 5, 1991

[30] Foreign Application Priority Data

Mar. 12, 1990 [JP] Japan ................................. 2-60580

[51] Int. Cl.$^5$ ........................................ G06F 15/36
[52] U.S. Cl. ................................. 364/554; 364/736
[58] Field of Search ..................... 364/554, 736, 812

[56] References Cited

U.S. PATENT DOCUMENTS

| Re. 33,629 | 7/1991 | Palmer et al. ............... 364/737 |
|---|---|---|
| 4,020,286 | 4/1977 | Ceci ............................. 364/554 |
| 4,115,867 | 9/1978 | Vladimirov et al. ......... 364/554 |
| 4,206,505 | 6/1980 | Zorina et al. ................ 364/554 |
| 4,321,688 | 3/1982 | Sado et al. ................... 364/554 |
| 4,395,762 | 7/1983 | Wondergen et al. ......... 364/554 |
| 4,433,385 | 2/1984 | DeGasperi et al. .......... 364/554 |
| 4,774,682 | 9/1988 | White ........................... 364/554 |
| 4,926,353 | 3/1990 | Groezinger ................... 364/554 |
| 5,117,379 | 5/1992 | Yanagiuchi et al. ...... 364/715.01 |

Primary Examiner—Thomas G. Black
Assistant Examiner—Michael Zanelli
Attorney, Agent, or Firm—Cooper & Dunham

[57] ABSTRACT

A statistical processor has a calculating section for calculating and providing data required to perform a statistical processing on the basis of supplied sampling data every time when the sampling data are supplied to the statistical processor; a plurality of registers for respectively storing the data calculated and provided by the calculating section; a statistical calculating section for calculating and providing desirable statistical results on the basis of data transmitted from the registers; and a control section for controlling the operations of the calculating section, the registers and the statistical calculating section.

10 Claims, 3 Drawing Sheets

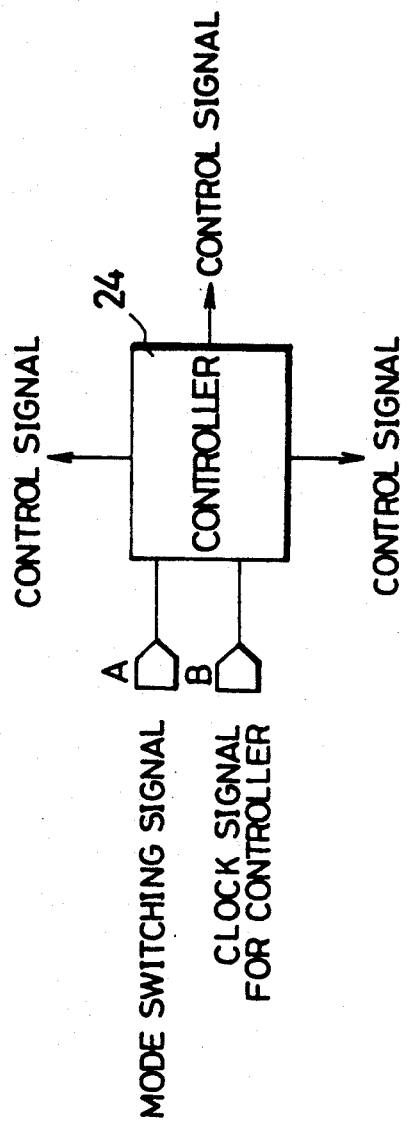

Fig. 2

STATISTICAL PROCESSOR

BACKGROUND OF THE INVENTION

1. Field of the Invention

The present invention relates to a statistical processor for performing a regression analysis with respect to sampling data.

2. Description of the Related Art

A regression analysis (least square method) for determining a function representing transition of plural data respectively having deviations is performed by calculating a regression straight line in the case of a linear function and a regression curve in the case of a function of the n-th order where n designates an integer equal to or greater than two. In the case of the regression straight line, coefficients $\alpha$ and $\beta$ are calculated by the following normal equation (1).

$$\begin{pmatrix} 1 & \bar{X} \\ \bar{X} & \bar{X^2} \end{pmatrix} \begin{pmatrix} \alpha \\ \beta \end{pmatrix} = \begin{pmatrix} \bar{Y} \\ \bar{XY} \end{pmatrix} \quad (1)$$

In the case of the regression curve, especially, a regression curve of the second order, coefficients $\alpha$, $\beta$ and $\gamma$ are calculated by the following normal equation (2).

$$\begin{pmatrix} 1 & \bar{X} & \bar{X^2} \\ \bar{X} & \bar{X^2} & \bar{X^3} \\ \bar{X^2} & \bar{X^3} & \bar{X^4} \end{pmatrix} \begin{pmatrix} \alpha \\ \beta \\ \gamma \end{pmatrix} = \begin{pmatrix} \bar{Y} \\ \bar{XY} \\ \bar{X^2 Y} \end{pmatrix} \quad (2)$$

In the equations (1) and (2), the following formulas are defined.

$$\bar{X} = \frac{1}{n} \Sigma X_i$$

$$\bar{X^2} = \frac{1}{n} \Sigma X_i^2$$

$$\bar{XY} = \frac{1}{n} \Sigma X_i Y_i$$

Thus, a regression straight line function represented by $Y = \alpha + \beta X$ is estimated by the calculation of the coefficients $\alpha$ and $\beta$ in the case of the linear function. A regression curve function represented by $Y = \alpha + \beta X + \gamma X^2$ is estimated by the calculation of the coefficients $\alpha$, $\beta$ and $\gamma$ in the case of the function of the second order.

There is a case in which supplied data are unstable and the operation of a processor is controlled to provide more stable output data in a processing for outputting data periodically processed. In such a case, there is an optimum method for controlling the operation of the processor in which the output data are fed back and transition of the output data is analyzed by the regression analysis thereof. In general, such a processing with respect to the regression analysis is performed by a microprocessor.

However, when such a processing is performed for a very short period, it is necessary to control the operation of the microprocessor using the regression analysis at a high speed. In particular, a real-time processing must be performed with respect to the regression analysis. In such a case, there are less problems when the linear function represented by a straight line are calculated since the processing is not complicated. However, when the function of the more than two order represented by a curve is calculated, it is necessary to perform many processings having more than several hundred steps so that it is impossible to perform the real-time processing by the microprocessor. For example, the respective coefficients $\alpha$, $\beta$ and $\gamma$ are concretely calculated by the following formulas (3) to (6).

$$\alpha = \frac{n^3 \begin{vmatrix} \bar{Y} & \bar{X} & \bar{X^2} \\ \bar{XY} & \bar{X^2} & \bar{X^3} \\ \bar{X^2 Y} & \bar{X^3} & \bar{X^4} \end{vmatrix}}{|A|} \quad (3)$$

$$\beta = \frac{n^3 \begin{vmatrix} 1 & \bar{Y} & \bar{X^2} \\ \bar{X} & \bar{XY} & \bar{X^3} \\ \bar{X^2} & \bar{X^2 Y} & \bar{X^4} \end{vmatrix}}{|A|} \quad (4)$$

$$\gamma = \frac{n^3 \begin{vmatrix} 1 & \bar{X} & \bar{Y} \\ \bar{X} & \bar{X^2} & \bar{XY} \\ \bar{X^2} & \bar{X^3} & \bar{X^2 Y} \end{vmatrix}}{|A|} \quad (5)$$

$$\begin{aligned} |A| &= n^3 \begin{vmatrix} 1 & \bar{X} & \bar{X^2} \\ \bar{X} & \bar{X^2} & \bar{X^3} \\ \bar{X^2} & \bar{X^3} & \bar{X^4} \end{vmatrix} \\ &= n \Sigma X^2 \Sigma X^4 + \Sigma X \Sigma X^2 \Sigma X^3 + \\ &\quad \Sigma X \Sigma X^2 \Sigma X^3 - (\Sigma X^2)^3 - \\ &\quad (\Sigma X)^2 \Sigma X^4 - n(\Sigma X^3)^2 \end{aligned} \quad (6)$$

SUMMARY OF THE INVENTION

It is therefore an object of the present invention to provide a statistical processor for performing a statistical processing such as a regression analysis at the real time in accordance with the number of sampling data.

The above object of the present invention can be achieved by a statistical processor comprising a calculating section for calculating and providing data required to perform a statistical processing on the basis of supplied sampling data every time when the sampling data are supplied to the statistical processor; a plurality of registers for respectively storing the data calculated and provided by the calculating section; a statistical calculating section for calculating and providing desirable statistical results on the basic of data transmitted from the registers; and a control section for controlling the operations of the calculating section, the registers and the statistical calculating section.

The calculating section calculates and provides data such as an accumulated sum, etc. required to perform a statistical processing by a control signal transmitted from the control section every time when the sampling data are supplied to the statistical processor. These data are stored to the respective registers. Accordingly, for example, it is not necessary to stop the operation of the statistical processor until all the sampling data required to perform a regression analysis are supplied to the statistical processor.

Thus, the data required to perform the statistical processing are stored to the registers in advance and the statistical calculating section for performing the statistical processing reads required data out of the registers by the control signal transmitted from the control section so as to calculate and provide desirable statistical results. Thus, it is possible to perform a statistical processing such as regression analysis at the real time.

Further objects and advantages of the present invention will be apparent from the following description of the preferred embodiments of the present invention as illustrated in the accompanying drawings.

BRIEF DESCRIPTION OF THE DRAWINGS

FIGS. 1a and 1b are a block diagram showing the construction of a statistical processor in one embodiment of the present invention; and FIG. 2 is a timing chart showing the operation of the statistical processor shown in FIGS. 1a and 1b.

DESCRIPTION OF THE PREFERRED EMBODIMENTS

Figure 1A:
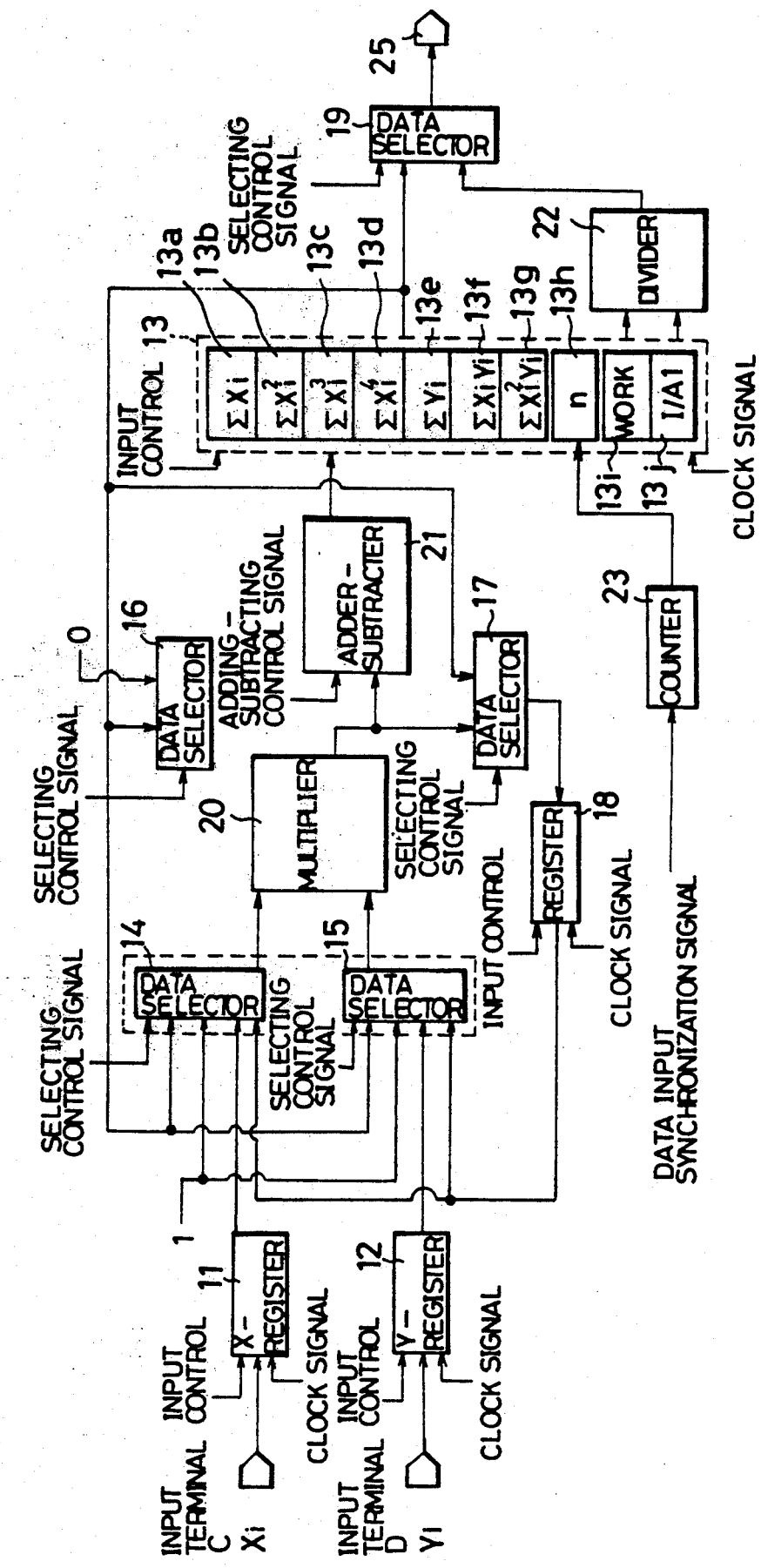

The preferred embodiment of a statistical processor in the present invention will next be described in detail with reference to the accompanying drawings.

FIGS. 1a and 1b shows the construction of a statistical processor for performing a regression analysis of the second order in accordance with one embodiment of the present invention. In this embodiment, the statistical processor is constructed by registers, a multiplier, etc. For example, the statistical processor is used in a control section, etc. for executing voltage control of a copying operation section in a copying machine.

An X-register 11 holds data value $X_i$ supplied as sampling data for performing a statistical processing through an input terminal C from an unillustrated computer for control, etc. The X-register 11 is connected to a data selector 14. Similarly, a Y-register 12 holds data value $Y_i$ supplied as sampling data for performing a statistical processing through an input terminal D from the above computer for control, etc. The Y-register 12 is connected to a data selector 15. In addition to the above data values $X_i$ and $Y_i$, data indicative of constant value one, output data of a register group 13 described later, and output data of a register 18 described later are also supplied to the data selectors 14 and 15. The data selectors 14 and 15 are circuits for selecting one of the above data by a control signal transmitted from a controller 24.

The controller 24 is a circuit for controlling the operation of each of constructional portions in the statistical processor in this embodiment. The controller 24 switches processing modes by a mode switching signal inputted through an input terminal A and transmits a control signal in synchronization with a clock signal for the controller inputted through an input terminal B.

Output terminals of the data selectors 14 and 15 are connected to a multiplier 20 for performing a multiplying operation with respect to data supplied from the data selectors 14 and 15. An output terminal of the multiplier 20 is connected to an adder-subtracter 21 and a data selector 17.

The adder-subtracter 21 is connected to an output terminal of a data selector 16 and performs an adding or subtracting operation with respect to data supplied from the multiplier 20 and the data selector 16 by the control signal transmitted from the controller 24.

The data selector 16 is a circuit for selecting one of supplied data indicative of numeral zero and data supplied from the register group 13 described later by the control signal transmitted from the controller 24.

The data selector 17 is a circuit for selecting one of data supplied from the multiplier 20 and data supplied from the register group 13 by the control signal transmitted from the controller 24.

An output terminal of the data selector 17 is connected to a register 18 for receiving a clock signal and the control signal from the controller 24. An output terminal of the register 18 is connected to the data selectors 14 and 15 as mentioned above.

An output terminal of the adder-subtracter 21 is connected to the register group 13. As shown in FIG. 1, the register group 13 is composed of a plurality of registers for separately storing respective data such as $\Sigma X_i$, $\Sigma X_i^2$, $\Sigma X_i^3$, the number n of supplying times of sampling data, work, matrix A, etc. calculated by using the above data selectors 14 and 15, the multiplier 20, the adder-subtracter 21, etc. The register group 13 stores the results of calculated data transmitted from the adder-subtracter 21 to a predetermined register by the control signal transmitted from the controller 24. The register group 13 also transmits desirable data from a predetermined register by the control signal from the controller 24. A counter 23 counts the number n of supplying times of sampling data supplied to the input terminals A and B and is connected to an n-register 13h of the register group 13. A clock signal is transmitted to the register group 13.

As mentioned above, the output terminal of the register group 13 is connected to the data selectors 14, 15, 16 and 17 and a data selector 19. The output terminal of the register group 13 is also connected to the data selector 19 through a divider 22.

The divider 22 is a circuit for performing a dividing operation to calculate the coefficients $\alpha$, $\beta$ and $\gamma$ of the regression straight line and the regression curve as mentioned above on the basis of data transmitted from a predetermined register within the register group 13 by the control signal of the controller 24.

The data selector 19 is a circuit for selecting one of data supplied from a register of the register group 13 and data supplied from the divider 22 by the control signal transmitted from the controller 24. The data selector 19 transmits the selected data to an output terminal 25.

Figure 2:
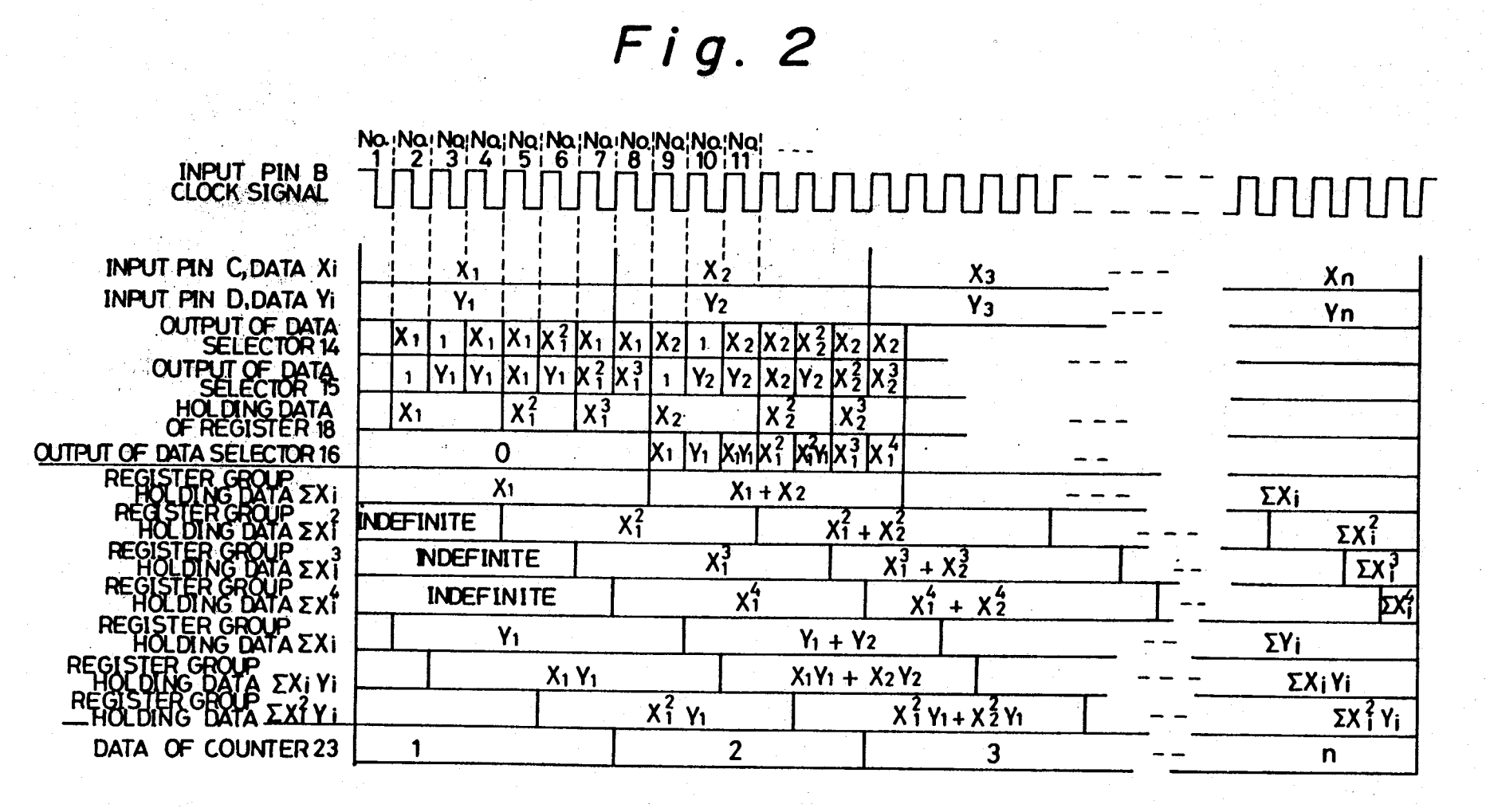

The operation of the statistical processor mentioned above will next be described with reference to FIG. 2. FIG. 2 shows the following data shown in FIG. 1a.

Data at the input terminal C,
data at the input terminal D,
data transmitted from the data selector 14,
data transmitted from the data selector 15,
data stored in the register 18,
data transmitted from the data selector 16,
data stored into the respective registers within the register group 13, and
data of the counter 23.

The respective constructional portions of the statistical processor are operated in synchronization with a clock signal.

A first sampling data value $X_1$ is transmitted to the input terminal C and a first sampling data value $Y_1$ is transmitted to the input terminal D from an unillustrated computer for control, etc.

The data value $X_1$ is inputted and stored to the X-register 11 as first sampling data by a first clock signal from the input terminal C. Similarly, the data value $Y_1$ is inputted and stored to the Y-register 12 from the input terminal D. The data selector 14 selects output data of the X-register 11 by a second clock signal and a control signal transmitted from the controller 24. The data selector 15 selects data indicative of numeral one by the control signal transmitted from the controller 24. The data value $X_1$ is transmitted from the X-register 11 through the data selector 14 to the multiplier 20. The data indicative of numeral one are transmitted from the data selector 15 to the multiplier 20. Accordingly, the multiplier 20 multiplies the data value $X_1$ by the numeral one so that the multiplied value $X_1$ is transmitted to the adder-subtractor 21 and the data selector 17. At this time, data indicative of constant value zero selected by the data selector 16 are supplied to the adder-subtracter 21 by the control signal transmitted from the controller 24. Further, the operation of the adder-subtracter 21 is controlled to perform an adding operation by the control signal transmitted from the controller 24. Therefore, the adder-subtractor 21 adds the value zero to the value $X_1$ so that the added value $X_1$ is transmitted to the register group 13. Thus, the register group 13 stores the transmitted value $X_1$ to a $\Sigma X_i$ register 13a by the control signal transmitted from the controller 24. The data selector 17 selects output data of the multiplier 20, i.e., the value $X_1$ by the control signal transmitted from the controller 24 and transmits this value $X_1$ to the register 18. Thus, the value $X_1$ is stored to the register 18.

The data selector 14 selects data indicative of constant value one by a third clock signal and the control signal transmitted from the controller 24. The data selector 15 selects output data value $Y_1$ of the Y-register 12 by the control signal transmitted from the controller 24. The data value $Y_1$ is transmitted from the Y-register 12 through the data selector 15 to the multiplier 20. The data indicative of value one are transmitted from the data selector 14 to the multiplier 20. Accordingly, the multiplier 20 multiplies the data value $Y_1$ by the value one so that the multiplied value $Y_1$ is transmitted to the adder-subtractor 21 and the data selector 17. At this time, the data indicative of constant value zero selected by the data selector 16 are supplied to the adder-subtracter 21 by the control signal transmitted from the controller 24. Further, the operation of the adder-subtractor 21 is controlled to perform an adding operation by the control signal transmitted from the controller 24. Therefore, the adder-subtracter 21 adds the constant value zero to the value $Y_1$ so that the added value $Y_1$ is transmitted to the register group 13. Thus, the register group 13 stores the transmitted value $Y_1$ to a $\ominus Y_i$ register 13e by the control signal transmitted from the controller 24. The data selector 17 performs the above-mentioned operation and transmits output data of the multiplier 20 to the register 18. At this time, no output data of the multiplier 20 are inputted to the register 18 by the control signal of the controller 24. Accordingly, the register 18 holds an operating state in which the value $X_1$ is stored to this register 18.

When a fourth clock signal is transmitted to the X-register 11 and the Y-register 12, the X-register 11 transmits the data value $X_1$ to the data selector 14 and the Y-selector 12 transmits the data value $Y_1$ to the data selector 15. In this case, the data selectors 14 and 15 respectively select the data values of the X-register 11 and the Y-register 12 by the control signal of the controller 24. Thus, the data values $X_1$ and $Y_1$ are transmitted to the multiplier 20. The multiplier 20 performs a multiplying operation with respect to these data values so that the multiplied value $X_1Y_1$ is transmitted to the adder-subtracter 21 and the data selector 17. In this case, the operations of the register 18 and the adder-subtracter 21 are similar to those in the above case of the second clock signal. Thus, data indicative of the value $X_1Y_1$ are transmitted from the adder-subtracter 21 to the register group 13. The register group 13 stores these data to a $\Sigma X_iY_i$ register 13f by the control signal of the controller 24.

When a fifth clock signal is transmitted to the X-register 11 and the Y-register 12, the data selector 14 selects output data of the X-register 11 by the control signal of the controller 24 and the data selector 15 selects data indicative of the value $X_1$ transmitted from the register 18 by the control signal of the controller 24. Thus, the multiplier 20 performs a multiplying operation with respect to the values $X_1$ and $X_1$ so that the multiplied data value $X_1^2$ is transmitted to the data selector 17 and the adder-subtracter 21. The adder-subtracter 21 performs the above-mentioned operation and transmits the data value $X_1^2$ to the register group 13. The register group 13 stores this value $X_1^2$ to a $\Sigma X_i^2$ register 13b by the control signal of the controller 24. The data selector 17 transmits the data value $X_1^2$ to the register 18. The register 18 stores this data value $X_1^2$ by the control signal of the controller 24.

When a sixth clock signal is transmitted to the X-register 11 and the Y-register 12, the data selector 14 selects the value $X_1^2$ as output data of the register 18 by the control signal of the controller 24 and the data selector 15 selects data indicative of the value $Y_1$ transmitted from the Y-register 12 by the control signal of the controller 24. Thus, the multiplier 20 performs a multiplying operation with respect to the values $X_1^2$ and $Y_1$ so that the multiplied data value $X_1^2Y_1$ is transmitted to the data selector 17 and the adder-subtracter 21. The adder-subtracter 21 performs the above-mentioned operation and transmits the data value $X_1^2Y_1$ to the register group 13. The register group 13 stores this value $X_1^2Y_1$ to a $\Sigma X_i^2Y_i$ register 13g by the control signal of the controller 24. The data selector 17 transmits the data value $X_1^2Y_1$ to the register 18. However, no data value $X_1^2Y_1$ is inputted and stored to the register 18 by the control signal of the controller 24.

When a seventh clock signal is transmitted to the X-register 11 and the Y-register 12, the data selector 14 selects the output data value $X_1$ of the X-register 11 by the control signal of the controller 24 and the data selector 15 selects the data value $X_1^2$ transmitted from the register 18 by the control signal of the controller 24. Thus, the multiplier 20 performs a multiplying operation with respect to the values $X_1$ and $X_1^2$ so that the multiplied data value $X_1^3$ is transmitted to the data selector 17 and the adder-subtracter 21. The adder-subtracter 21 performs the above-mentioned operation and transmits the data value $X_1^3$ to the register group 13. The register group 13 stores this value $X_1^3$ to a $\Sigma X_i^3$ register 13c by the control signal of the controller 24. The data selector 17 transmits the data value $X_1^3$ to the register 18. The register 18 stores this data value $X_1^3$ by the control signal of the controller 24.

When an eighth clock signal is transmitted to the X-register 11 and the Y-register 12, the data selector 14 selects the output data value $X_1$ of the X-register 11 by the control signal of the controller 24 and the data selector 15 selects the data value $X_1^3$ transmitted from the register 18 by the control signal of the controller 24. Thus, the multiplier 20 performs a multiplying operation with respect to the values $X_1$ and $X_1^3$ so that the multiplied data value $X_1^4$ is transmitted to the data selector 17 and the adder-subtracter 21. The adder-subtracter 21 performs the above-mentioned operation and transmits the data value $X_1^4$ to the register group 13. The register group 13 stores this value $X_1^4$ to a $\Sigma X_i^4$ register 13d by the control signal of the controller 24. The data selector 17 transmits the data value $X_1^4$ to the register 18. However, no data value $X_1^4$ is inputted and stored to the register 18 by the control signal of the controller 24.

When the processings with respect to the eighth clock signal are performed, the next sampling data value $X_2$ is transmitted to the input terminal C and the next sampling data value $Y_2$ is transmitted to the input terminal D.

When a ninth clock signal is transmitted to the X-register 11 and the Y-register 12, the operation of the statistical processor is approximately similar to that in the case of the first clock signal. Namely, the data selector 14 selects output data of the X-register 11 by the control signal transmitted from the controller 24. The data selector 15 selects data indicative of numeral one by the control signal transmitted from the controller 24. Thus, data indicative of the value $X_2$ are supplied from the data selector 14 to the multiplier 20 and data indicative of the numeral one are supplied from the data selector 15 to the multiplier 20. The multiplier 20 performs a multiplying operation with respect to the values $X_2$ and one so that the multiplied value $X_2$ is transmitted to the adder-subtracter 21 and the data selector 17. When the eighth clock signal is transmitted to the X-register 11 and the Y-register 12, the stored data value $X_1$ is transmitted from the register 13a within the register group 13 by the control signal of the controller 24. As shown by "output of data selector 16" in FIG. 2, the data selector 16 selects output data of the register 13a by the control signal of the controller 24 and transmits these output data indicative of the value $X_1$ to the adder-subtracter 21. The operation of the adder-subtracter 21 is controlled to perform an adding operation by the control signal transmitted from the controller 24. Thus, the adder-subtracter 21 adds the value $X_2$ to the value $X_1$ so that the added value $X_1+X_2$ is transmitted to the register group 13. The register group 13 stores the transmitted value $X_1+X_2$ to the $\Sigma X_i$ register 13a by the control signal transmitted from the controller 24. The data selector 17 selects output data of the multiplier 20, i.e., the value $X_2$ by the control signal transmitted from the controller 24 and transmits this value $X_2$ to the register 18. Thus, the value $X_2$ is stored to the register 18.

When a tenth clock signal is transmitted to the X-register 11 and the Y-register 12 as a first clock signal after a regression analysis begins to be performed, the data selector 14 selects data indicative of constant value one by the control signal transmitted from the controller 24. The data selector 15 selects output data value $Y_2$ of the Y-register 12 by the control signal transmitted from the controller 24. The data value $Y_2$ is transmitted from the Y-register 12 through the data selector 15 to the multiplier 20. The constant value one is transmitted from the data selector 14 to the multiplier 20. The multiplier 20 thus performs a multiplying operation with respect to the values $Y_2$ and one so that the multiplied value $Y_2$ is transmitted to the adder-subtracter 21 and the data selector 17. When the tenth clock signal is transmitted to the X-register 11 and the Y-register 12, the stored data value $Y_1$ is transmitted from the register 13e within the register group 13 by the control signal of the controller 24. As shown by "output of data selector 16" in FIG. 2, the data selector 16 selects output data of the register 13e by the control signal of the controller 24 and transmits these output data indicative of the value $Y_1$ to the adder-subtracter 21. The operation of the adder-subtracter 21 is controlled to perform an adding operation by the control signal transmitted from the controller 24. Thus, the adder-subtracter 21 adds the value $Y_2$ to the value $Y_1$ so that the added value $Y_1+Y_2$ is transmitted to the register group 13. The register group 13 stores the transmitted value $Y_1+Y_2$ to the $\Sigma Y_i$ register 13e by the control signal transmitted from the controller 24. The data selector 17 performs the above-mentioned operation and transmits output data of the multiplier 20 to the register 18. However, at this time, no output data of the multiplier 20 are inputted to the register 18 by the control signal of the controller 24. Therefore, the register 18 holds an operating state in which the value $X_2$ is stored into the register 18.

As mentioned above, the values stored into the respective registers of the register group 13 are sequentially replaced by values provided by performing an adding operation with respect to the stored values and values calculated by sampling data every time when these sampling data are supplied to the input terminals C and D. Then, the replaced values are stored to the respective registers. Accordingly, the added values are stored into the respective registers of the register group 13.

The respective coefficients $\alpha$, $\beta$ and $\gamma$ are calculated from each of the obtained values $\Sigma X_i$, $\Sigma X_i^2$, $\Sigma X_i^3$, $\Sigma X_i^4$, $\Sigma Y_i$, $\Sigma X_i Y_i$, $\Sigma X_i^2 Y_i$, and the number n of supplied sampling data by using the statistical processor in the present invention as follows.

The respective coefficients $\alpha$, $\beta$ and $\gamma$ are calculated by the above-mentioned formulas (3), (4) and (5). The above matrix A can be calculated by the above formula (6). For example, the first term of the formula (6), i.e., $n\Sigma X_i^2 \Sigma X_i^4$ is calculated as follows.

When a first clock signal is transmitted to the X-register 11 and the Y-register 12, a stored value $\Sigma X_i^2$ is transmitted from the $\Sigma X_i^2$ register 13b within the register group 13 to the data selector 14, etc. by a control signal of the controller 24. At this time, the data selector 14 selects the above value $\Sigma X_i^2$ by the control signal of the controller 24 and the data selector 15 selects value one. The multiplier 20 thus performs a multiplying operation with respect to the values one and $\Sigma X_i^2$ so that the multiplied value $\Sigma X_i^2$ is transmitted to the data selector 17 and the adder-subtracter 21. The data selector 17 selects output data value $\Sigma X_i^2$ of the multiplier 20 by the control signal of the controller 24 and transmits this data value $\Sigma X_i^2$ to the register 18. Thus, the data value $\Sigma X_i^2$ is stored to the register 18. The adder-subtracter 21 performs predetermined adding and subtracting operations and the calculated results are transmitted to the register group 13. However, these calculated results are not inputted to the register group 13 by the control signal of the controller 24.

When the next clock signal is transmitted to the X-register 11 and the Y-register 12, similar to the above case, stored value $\Sigma X_i^4$ is transmitted from the $\Sigma X_i^4$ register 13d within the register group 13 to the data selector 14, etc. by the control signal of the controller 24. The data selector 14 selects output data value $\Sigma X_i^4$ of the $\Sigma X_i^4$ register 13d by the control signal of the controller 24. The data selector 15 selects data value $\Sigma X_i^2$ transmitted from the register 18 by the control signal of the controller 24. Thus, the multiplier 20 performs a multiplying operation with respect to the values $\Sigma X_i^2$ and $\Sigma X_i^4$ so that the multiplied data value $\Sigma X_i^2 \Sigma X_i^4$ is transmitted to the data selector 17 and the adder-subtracter 21. The adder-subtracter 21 performs a predetermined calculation and the calculated results are transmitted to the register group 13. However, these calculated results are not inputted to the register group 13 by the control signal of the controller 24. On the other hand, the data selector 17 selects the data value $\Sigma X_i^2 \Sigma X_i^4$ by the control signal of the controller 24 and transmits this value to the register 18. The register 18 stores this value $\Sigma X_i^2 \Sigma X_i^4$ by the control signal of the controller 24.

When the next clock signal is transmitted to the X-register 11 and the Y-register 12, similar to the above case, a stored counting value n is transmitted from the n-register 13h within the register group 13 to the data selector 14, etc. by the control signal of the controller 24. The data selector 14 selects output data of the n-register 13h by the control signal of the controller 24. The data selector 15 selects data value $\Sigma X_i^2 \Sigma X_i^4$ transmitted from the register 18 by the control signal of the controller 24. Thus, the multiplier 20 performs a multiplying operation with respect to the values n and $\Sigma X_i^2 \Sigma X_i^4$ so that the multiplied data value $n\Sigma X_i^2 \Sigma X_i^4$ is transmitted to the data selector 17 and the adder-subtracter 21. At this time, the data selector 16 selects numeral zero by the control signal of the controller 24 and transmits this numeral zero to the adder-subtracter 21. The adder-subtracter 21 adds this numeral zero to the value $n\Sigma X_i^2 \Sigma X_i^4$ and transmits the added value $n\Sigma X_i^2 \Sigma X_i^4$ to the register group 13. The register group 13 stores the transmitted value $n\Sigma X_i^2 \Sigma X_i^4$ to a work register 13i by the control signal of the controller 24. On the other hand, the data selector 17 selects the data value $n\Sigma X_i^2 \Sigma X_i^4$ by the control signal of the controller 24 and transmits this value to the register 18. However, this value $n\Sigma X_i^2 \Sigma X_i^4$ is not inputted to the register 18 by the control signal of the controller 24.

The first term of the formula (6), $n\Sigma X_i^2 \Sigma X_i^4$ is calculated by the above-mentioned operations and is stored to the work register 13i. Similarly, the second term of the formula (6), $\Sigma X_i \Sigma X_i^2 \Sigma X_i^3$ is calculated and stored to the register 18. The data selector 14 selects output data of the register 18 by the control signal of the controller 24 and the data selector 15 selects numeral one. Thus, the multiplier 20 can transmit multiplied value $\Sigma X_i \Sigma X_i^2 \Sigma X_i^3$ to the adder-subtracter 21. At this time, stored value $n\Sigma X_i^2 \Sigma X_i^4$ is read out of the work register 13i and the data selector 16 selects output data of the work register 13i, i.e., $n\Sigma X_i^2 \Sigma X_i^4$ by the control signal of the controller 24. The adder-subtracter 21 adds the value $n\Sigma X_i^2 \Sigma X_i^4$ to the value $\Sigma X_i \Sigma X_i^2 \Sigma X_i^3$ and the added value $n\Sigma X_i^2 \Sigma X_i^4 + \Sigma X_i \Sigma X_i^2 \Sigma X_i^3$ is stored to the work register 13i by the control signal of the controller 24.

The matrix A represented by the formula (6) is similarly calculated. The calculated matrix A is stored to a matrix-A register 13j by the control signal of the controller 24.

The matrix A constituting the denominators in the formulas (3), (4) and (5) is calculated by the above-mentioned operations. For example, a numerator in the formula (3) is calculated by using the respective values stored into the registers 13a to 13h within the register group 13 and performing operations similar to the above-mentioned operations with respect to these values. The calculated numerator is stored to the work register 13i by the control signal of the controller 24.

Thus, the denominator and numerator values required to calculate the coefficient $\alpha$ in the formula (3) have been obtained. The register group 13 transmits the stored values of the work register 13i and the matrix-A register 13j to the divider 22 by the control signal of the controller 24. The divider 22 divides the stored value of the work register 13i by the stored value of the matrix-A register 13j on the basis of the formula (3). Thus, the coefficient $\alpha$ is calculated and transmitted to the data selector 19. The data selector 19 selects and transmits this calculated coefficient $\alpha$ to the exterior of the statistical processor by the control signal of the controller 24.

The coefficients $\beta$ and $\gamma$ can be similarly calculated so that a regression curve can be obtained.

The operation of the statistical processor in this embodiment is operated as mentioned above. In this statistical processor, the values $\Sigma X_i$, $\Sigma X_i^2$, $\Sigma X_i^3$, etc. stored to the registers 13a to 13h within the register group 13 are calculated at the real time together with the input of sampling data. After these values have been calculated, the coefficients $\alpha$, $\beta$ and $\gamma$ can be calculated by processings having several ten steps at most. Accordingly, it is possible to perform a regression analysis at a high speed in comparison with that in the case of a general microprocessor in which processings having several hundred steps are required to calculate the above coefficients.

The regression curve is calculated in the above embodiment, but a regression straight line can be also calculated by providing coefficients $\alpha$ and $\beta$.

In accordance with the statistical processor in this embodiment, values $\Sigma X_i$, $\Sigma X_i^2$, $\Sigma X_i^3$, etc. are calculated every time when sampling data are supplied to the statistical processor. Accordingly, there is no limit with respect to the number of sampling data supplied to the statistical processor. Further, there is no case in which the operation of the statistical processor is stopped until all the sampling data are supplied to the statistical processor even when the number of sampling data is determined in advance. When no sampling data are supplied to the statistical processor or a predetermined number of sampling data have been completely supplied to the statistical processor, the results of coefficients $\alpha$, $\beta$, etc. provided by the above statistical calculations are outputted by transmitting a mode switching signal transmitted from an unillustrated computer for control to the controller 24 through the input terminal A and performing the above-mentioned control operation of the controller 24.

Further, in the statistical processor in this embodiment, the final results of the values $\Sigma X_i$, $\Sigma X_i^2$, $\Sigma X_i^3$, etc. are stored to the respective registers without limiting a regression straight line and a regression curve. Accordingly, it is possible to calculate a sampling average by dividing the value $\Sigma X_i$ by positive integer n by the divider 22 and further perform the other statistical calculations such as a sampling distribution, etc. The statistical results calculated and outputted from the statistical processor are different from each other by transmitting the mode switching signal transmitted from the computer for control to the controller 24.

As mentioned above, in accordance with the present invention, a calculating section calculates and provides data such as an accumulated sum, etc. required to perform a statistical processing every time when sampling data are supplied to the statistical processor. These data are stored to the respective registers. Thus, the data required to perform a statistical processing are stored to the registers in advance and the calculating section for performing the statistical processing reads required data out of the registers by a control signal transmitted from a control section so as to calculate and provide desirable statistical results. Thus, it is possible to perform a statistical processing such as regression analysis at the real time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A statistical processor for statistically processing at least two variable data sets each including a plurality of variable data values, said variable data values being applied sequentially to said processor during one or more predetermined periods, said processor comprising:

operating means for performing predetermined arithmetic operations on input data values applied thereto during one predetermined period and for obtaining operating result data;

storing means for storing said operating result data obtained by said operating means, said storing means comprising a plurality of registers, each of said plurality of registers storing respective operating result data obtained by said operating means, and said storing means being accessed when said operating result data is written thereto or read therefrom;

selecting means for selecting said input data values from at least two variable data values applied during one or more predetermined periods and said operating result data in said storing means to supply said selected input data values to said operating means; and controlling means for controlling a pipeline processing of said selecting means, said operating means, and said storing means;

wherein said operating means comprises at least first, second and third inputs receiving respective ones of said selected input data values, a multiplier connected to said first and second inputs for multiplying an input data value applied to said first input by an input data value applied to said second input to output the product data to an output, and an adder connected to said third input and said output of said multiplier for adding an input data value applied to said third input with the product data from said multiplier.

2. A statistical processor as claimed in claim 1, wherein said adder operates as a subtractor in response to a control signal from said controlling means.

3. A statistical processor as claimed in claim 1, wherein said selecting means comprises a first selector connected to said first input for selecting one data value from one of two variable data values applied during one or more predetermined periods, said operating result data in one of said plurality of registers, and a constant value data indicative of unity to supply said selected data value to said multiplier through said first input, a second selector connected to said second input for selecting any one data values from the other of said two variable data values, said operating result data in said one of said plurality of registers, and a constant value data indicative of unity to supply said selected data value to said multiplier through said second input and a third selector connected to said third input for selecting any one data value from said operating result data in said one of said plurality of registers and a constant value data indicative of zero to supply said selected data value to said adder through said third input.

4. A statistical processor as claimed in claim 3, wherein said selecting means further comprises a fourth selector connected to said output of said multiplier and said storing means for selecting one data value from a product data of said multiplier and said operating result data in said one of said plurality of registers.

5. A statistical processor as claimed in claim 4, wherein said storing means comprises a further register having an input connected to said fourth selector and an output connected to said first and second selectors.

6. A statistical processor for performing a regression analysis on at least two variable data sets each including a plurality of variable data values, each of said variable data values being applied sequentially to said processor during one or more predetermined periods, said processor comprising:

a multiplier having first and second inputs for multiplying an input data value applied to said first input by an input data value applied to said second input to output the product data to an output;

an adder-subtractor having an input connected to said output of said multiplier for adding an input data value applied to another input thereof with a product data value from said multiplier or for subtracting an input data value applied to said input or said other input from another input data value;

a plurality of registers each storing an operating result data value from said adder-subtractor;

a first selector connected to said first input of said multiplier for selecting any one data value from one of two variable data values, an operating result data value in one of said plurality of registers, and a constant data value to supply said selected data value to said multiplier through said first input;

a second selector connected to said second input of said multiplier for selecting any one data value from the other of said two variable data values, said operating result data value in said one of said plurality of registers, and a constant data value to supply said selected data to said multiplier through said second input;

a third selector connected to said other input of said adder-subtractor for selecting any one data value from said operating result data value in said one of said plurality of registers and a constant data value to supply said selected data value to said adder-subtractor through said other input;

a fourth selector connected to said output of said multiplier and said plurality of registers for selecting any one data value from a product data value by said multiplier and said operating result data value in said one of said plurality of registers;

a further register having an input connected to said fourth selector and an output connected to said first and second selectors; and controlling means for controlling a pipeline processing in said selectors, said multiplier, said adder-subtractor, said plurality of registers, and said further register to perform a predetermined statistical processing required for the regression analysis on said two variable data sets.

7. A statisical processor as claimed in claim 6, wherein said pipeline processing is carried out until all data required to perform the predetermined statistical processing is obtained.

8. A statistical processor as claimed in claim 6, wherein said processor operates in a plurality of modes each adapted to perform a respective one of a plurality of statistical processing on said two variable data sets, and said controlling means includes mode switching means, receiving an external mode switching signal, for controlling the pipeline processing to perform said respective one of said plurality of statistical processing.

9. A statistical processor as claimed in claim 6, wherein said processor further comprises a divider having two inputs connected to said plurality of registers for performing a divisional operation between two input data values applied through said inputs to output the result.

10. A statistical processor as claimed in claim 6, including means for storing in advance, in some of said plurality of registers, data required to perform the predetermined statistical processing.

* * * * *